March 1, 1966 E. J. HAYES 3,237,732
DISK WITH V-GROOVED BRAKING SURFACES
Filed March 12, 1964

INVENTOR.
Edward J. Hayes.
BY
Harness, Dickey & Pierce
ATTORNEYS.

United States Patent Office

3,237,732
Patented Mar. 1, 1966

3,237,732
DISK WITH V-GROOVED BRAKING SURFACES
Edward James Hayes, Livonia, Mich., assignor to Kelsey-Hayes Company, Romulus, Mich., a corporation of Delaware
Filed Mar. 12, 1964, Ser. No. 351,466
4 Claims. (Cl. 188—218)

This invention relates to vehicle brakes and, more particularly, to improvements in disk brakes whereby higher braking torques are developed than are possible with conventional disk brakes.

One of the objects of the invention is to provide a disk brake in which the braking surface of the disk is provided with a pair of opposed V-shaped grooves and in which the brake shoes are wedge shaped in cross section and wherein the brake shoes engage the V-shaped grooves with a wedging action to thus develop a substantially higher braking torque than is possible with conventional brakes of the same general type.

Another object of this invention is to provide a device of this character in which reinforcing ribs may be conveniently associated with the braking surface of the disk, which ribs also serve as cooling fins for the brake disk.

Another object of the invention is to provide a disk brake incorporating the above advantages which is so reduced in the number and character of its component parts as to approach the ultimate in structural simplicity to thereby create an economy in its manufacturing, installation, and maintenance costs.

Figure 1:
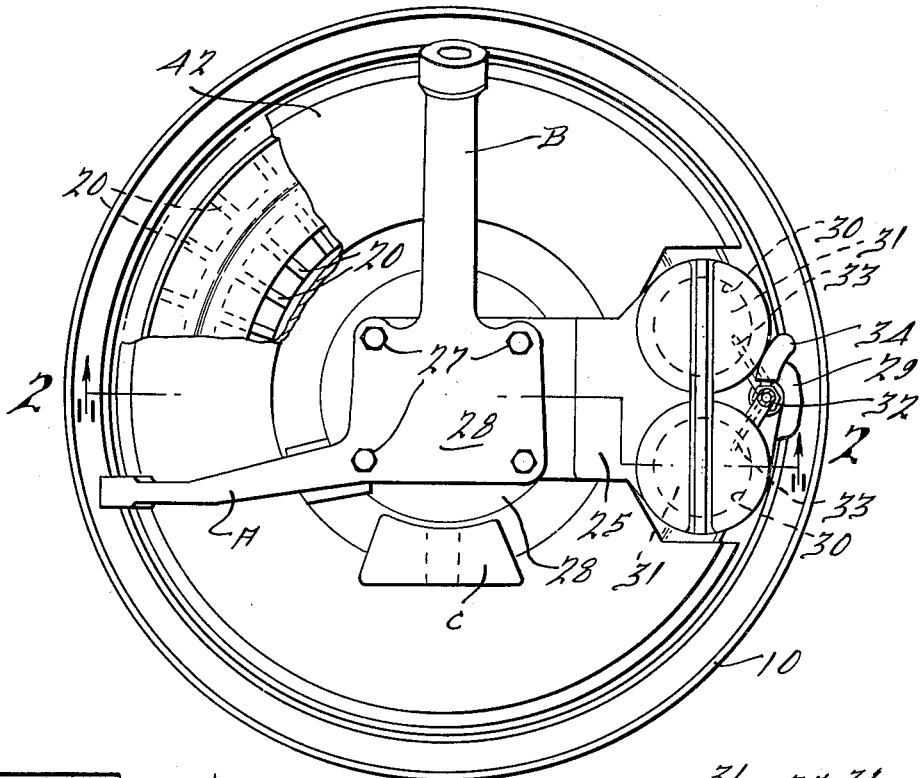
Figure 2:
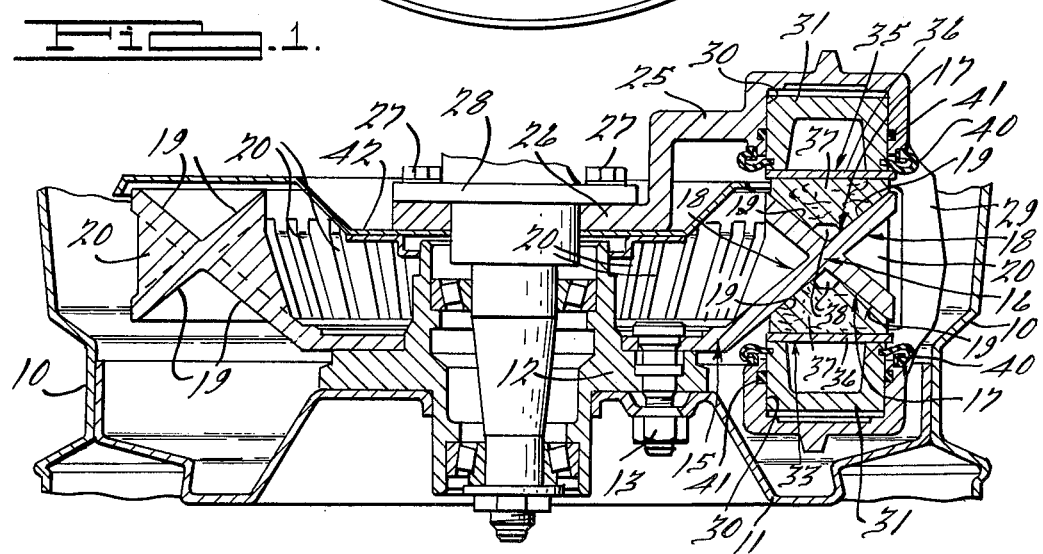

The various objects and advantages, and the novel details of construction of one commercially practical embodiment of the invention, will become more apparent as this description proceeds, especially when considered in connection with the accompanying drawings, in which:

FIGURE 1 is a rear elevational view of a disk brake mounted on a wheel, of a brake constructed in accordance with this invention, certain parts being broken away; and FIGURE 2 is an enlarged sectional view taken substantially on the plane indicated by line 2—2 in FIGURE 1.

The brake disk of this invention is shown as being associated with a vehicle wheel having a rim 10 and a wheel body 11 secured to the axle flange 12 by means of studs or bolt and nut assemblies 13.

Also secured to the axle flange 12, for instance by means of the same stud or bolt and nut assemblies 13, is a brake disk 15. The periphery 16 of the brake disk 15 is substantially X-shaped in cross section to provide a pair of axially opposed V-shaped grooves 17 and a pair of radially opposed V-shaped grooves 18. The adjacent walls 19 of the V-shaped grooves 17 constitute the braking surfaces of the brake disk 15. The opposing walls of the radially spaced V-shaped grooves 18 are connected by webs or fins 20 circumferentially spaced about the brake disk. These webs or fins reinforce the braking surfaces 19 and act as cooling fins for the brake disk.

The reference character 25 indicates generally a torque member or spider having an inner annular flange 26 secured by bolts or the like 27 to a fixed part 28 of the axle structure. The outer periphery of the torque member or spider 25 is provided with a caliper-like housing or portion 29 which straddles the periphery of the brake disk 15 throughout a portion thereof. The housing portion 29 is provided with pairs of cylinders or bores 30 in which pistons 31 operate. Hydraulic fluid under pressure is supplied to each of the cylinders 30 through a fluid pressure inlet 32 connected by passages 33 (see FIGURE 1), and the sets of cylinders 30 are connected by a conduit 34 so that all four cylinders may be supplied with hydraulic fluid simultaneously.

If the wheel to which the brake is applied is the front steering wheel of the vehicle, it is provided with an arm A adapted to be connected to the steering linkage and with upper and lower arms B and C provided with aligned apertures adapted to be engaged by the kingpin of the steering mechanism. However, as will be obvious, these elements form no part of the present invention.

Each pair of pistons 31 is adapted to actuate a brake shoe 35 which may consist of a backing plate 36 and a brake lining 37. It will be noted that each brake lining 37 is considerably thicker than customary and is wedge shaped in cross section so as to engage the braking surfaces 19 of the V-shaped grooves 17 with a wedging action. The wedging engagement of the brake shoe linings 37 with the V-shaped grooves 17 develops a substantially higher braking torque than is possible with conventional brakes of the same general type.

The apexes of the wedge-shaped brake linings 37 are preferably relieved or cut away as at 38 so that it will be unnecessary to shape the lining members 37 to a fine or sharp edge. In the form of the invention illustrated, the included angle between the braking surfaces 19 of each of the V-shaped grooves is substantially 90° and, hence, the included angle between the contacting surfaces of the lining members 37 will be substantially 90°. However, the included angle between the braking surfaces 19 of the V-shaped grooves 17 may be increased or diminished as may also the included angle between the contacting surfaces of the brake linings 37.

With the construction just described, when the pistons 31 are moved toward one another, the linings 37 engage the braking surfaces 19 with a wedging action and thus develop a substantially higher braking torque than is possible with disk brakes in which the brake disk and lining are provided with flat parallel surfaces. Thus, less pedal pressure is required to apply the brakes.

If desired, flexible dust boots 40 are provided for each piston to prevent the entrance of foreign material between the pistons 31 and the cylinders 30. The reference character 41 indicates seals, such as O-rings, interposed between the pistons 31 and the cylinders 30. A dust cover or guard 42 carried by the stationary axle part 28 may be provided to enclose the brake mechanism.

As previously stated, the braking torque of the brake is materially increased by forming the brake surfaces 19 in the form of V-grooves engageable with wedge-shaped lining portions 37. The X-shaped construction of the periphery of the brake disk also results in the formation of a pair of radially opposed V-grooves, and the webs or fins 20 which span these grooves not only act to reinforce the braking surfaces 19, but provide cooling fins which agitate the air to assist in cooling the brake disk and its associated parts.

While two pairs of opposed pistons 31 are shown, it will be obvious that each brake shoe may be operated by a single piston or by more than two, if desired.

While one commercially practical embodiment of the invention has been described and illustrated herein somewhat in detail, it will be understood that various changes may be made as may come within the purview of the accompanying claims.

What is claimed is:
1. In a brake of the class described, a rotatable brake disk, a nonrotatable housing straddling the periphery of said brake disk, the periphery of said brake disk being X-shaped in cross section to provide a pair of axially arranged opposed V-shaped portions constituting the braking surfaces of said brake disk, and a pair of radially opposed V-shaped portions, and circumferentially disposed web portions connecting the sides of said last named V-shaped portions to reinforce the braking surfaces and to act as cooling fins for the brake disk.

2. A device as described in claim 1 in which the included angle between the walls of each of said V-shaped grooves is substantially 90°.

3. In a brake of the class described, a rotatable brake disk, a pair of brake shoes having wedge-shaped friction surfaces, a nonrotatable housing straddling the periphery of said brake disk, the periphery of said brake disk being X-shaped in cross section to provide pairs of axially opposed and radially opposed V-shaped grooves, said axially opposed V-shaped grooves constituting the braking surfaces of the brake disk, and circumferentially spaced webs connecting the walls of the radially opposed V-shaped grooves to reinforce the braking surfaces and to act as cooling fins for the brake disk.

4. A device as described in claim 3 in which the included angle between the walls of each of said V-shaped grooves is approximately 90° and the included angle between said friction surfaces on the brake shoes is substantially 90°.

References Cited by the Examiner

UNITED STATES PATENTS

| 195,124 | 9/1877 | Healy et al. | 188—73 |
| 1,140,829 | 5/1915 | Johnston | 188—71 |
| 2,869,688 | 1/1959 | Busch | 188—59 X |
| 3,113,643 | 12/1963 | Botterill | 188—73 |

FOREIGN PATENTS

| 160,002 | 11/1954 | Australia. |
| 1,319,456 | 1/1963 | France. |

FERGUS S. MIDDLETON, *Primary Examiner.*

ARTHUR L. LA POINT, MILTON BUCHLER,
*Examiners.*